(12) United States Patent
Werdecker et al.

(10) Patent No.: US 12,203,481 B2
(45) Date of Patent: Jan. 21, 2025

(54) COMPRESSOR ARRANGEMENT WITH REDUCED PROCESS GAS CONSUMPTION

(71) Applicant: EagleBurgmann Germany Gmbh & Co. KG, Wolfratshausen (DE)

(72) Inventors: Ferdinand Werdecker, Walchensee (DE); Glenn Schmidt, Coldspring, TX (US); Benjamin Hellmig, Munich (DE); Maximilian Frank, Munich (DE); Florian Bauer, Sachsenkam (DE); Andreas Fesl, Otterfing (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 18/274,129

(22) PCT Filed: Feb. 1, 2022

(86) PCT No.: PCT/EP2022/052333
§ 371 (c)(1),
(2) Date: Jul. 25, 2023

(87) PCT Pub. No.: WO2022/171491
PCT Pub. Date: Aug. 18, 2022

(65) Prior Publication Data
US 2024/0418178 A1 Dec. 19, 2024

(30) Foreign Application Priority Data
Feb. 1, 2021 (DE) .................. 10 2021 102 998.8

(51) Int. Cl.
*F04D 29/12* (2006.01)
(52) U.S. Cl.
CPC .................. *F04D 29/124* (2013.01)
(58) Field of Classification Search
CPC .................................................... F04D 29/104
See application file for complete search history.

(56) References Cited

U.S. PATENT DOCUMENTS

2018/0195618 A1    7/2018   Itadani et al.

FOREIGN PATENT DOCUMENTS

| DE | 102014226429 A1 | 6/2016 |
|----|-----------------|--------|
| DE | 102015226444 A1 | 6/2017 |

(Continued)

OTHER PUBLICATIONS

International Search Report issued in PCT/EP2022/052333, mailed Apr. 20, 2022.

*Primary Examiner* — Brian O Peters
(74) *Attorney, Agent, or Firm* — Locke Lord LLP; Scott D. Wofsy

(57) ABSTRACT

The invention relates to a compressor arrangement comprising a compressor (2) for compressing a process gas (13) from a suction region (21) towards a pressure region (22), a mechanical seal arrangement (3) for sealing against an atmosphere (6) on a shaft (5) of the compressor (2), wherein the mechanical seal arrangement comprises a mechanical seal (4) having a stationary slide ring (41) with a first sliding surface (41a) and a rotating slide ring (42) with a second sliding surface (42a), which define a sealing gap (42a) between the sliding surfaces (41a, 42a), and a barrier fluid supply (7) with a barrier fluid line (70) which extends from the pressure region (22) of the compressor (2) to the mechanical seal (4) and through which process gas is branched off from the pressure region, the stationary slide ring (41) having a through opening (8), which extends from a rear side (41b) of the stationary slide ring (41) to an orifice at the first sliding surface (41a) of the stationary slide ring to supply process gas from the barrier fluid line (70) through the stationary slide ring (41) to the sealing gap (40).

9 Claims, 2 Drawing Sheets

(56) References Cited

FOREIGN PATENT DOCUMENTS

| | | |
|---|---|---|
| DE | 102018208519 A1 | 12/2019 |
| WO | 2021/190803 A1 | 9/2021 |

COMPRESSOR ARRANGEMENT WITH REDUCED PROCESS GAS CONSUMPTION

CROSS-REFERENCE TO RELATED APPLICATIONS

This application is a U.S. National Phase Application filed under 35 U.S.C. § 371, based on International Patent Application No. PCT/EP2022/052333, filed Feb. 1, 2022, which claims priority to German Patent Application No. 10 2021 102 998.8, filed on Feb. 1, 2021, which are incorporated herein by reference.

DESCRIPTION

The present invention relates to a compressor arrangement comprising a compressor and preferably exactly one mechanical seal, which is significantly reduced in process gas consumption.

Figure 1:
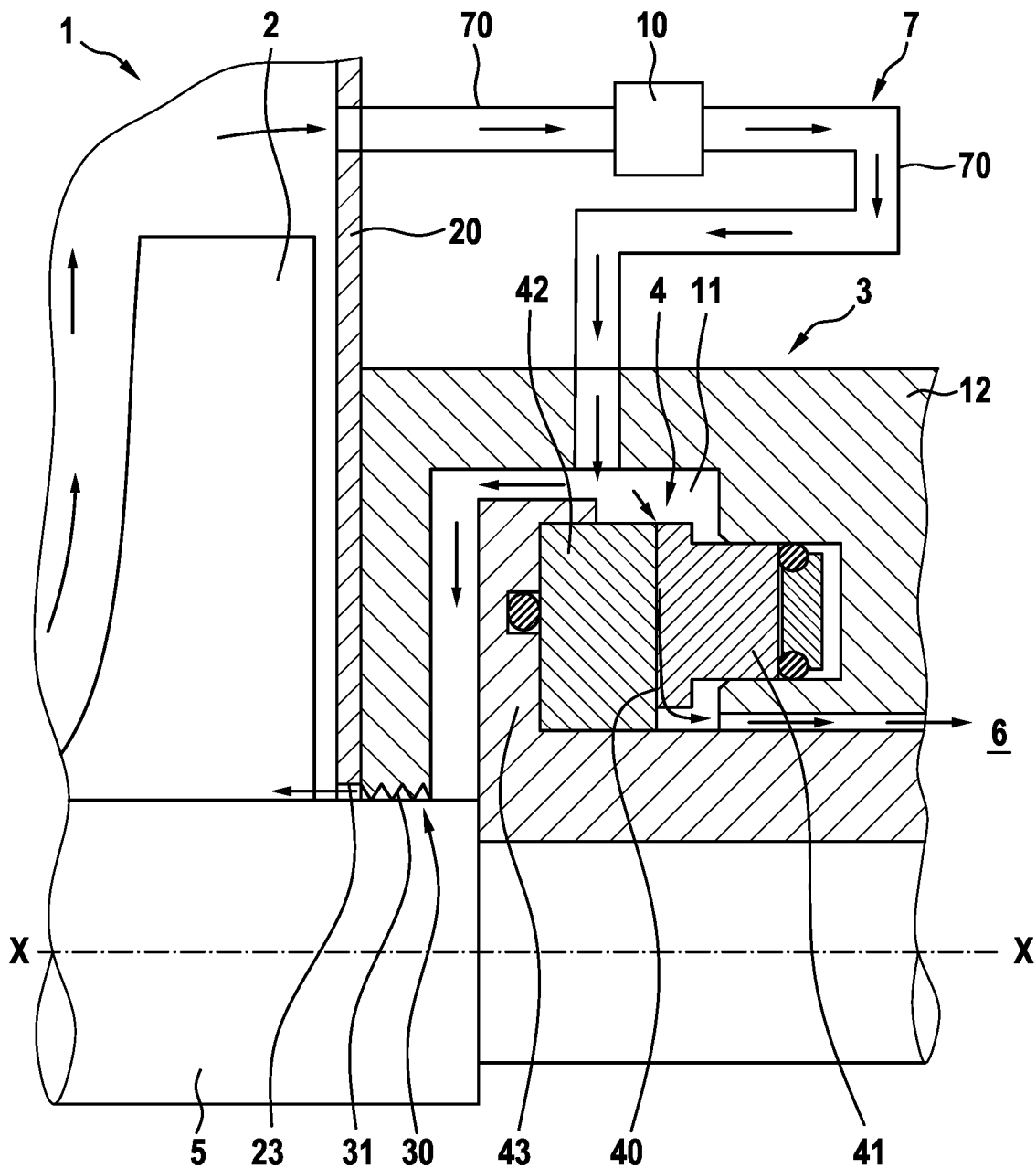

Compressor arrangements are known from prior art in various embodiments. Compressor arrangements 1, as shown in FIG. 1, are usually comprised of a compressor 2 and a mechanical seal arrangement 3. The mechanical seal arrangement 3 comprises a mechanical seal 4 with a stationary slide ring 41 and a rotating slide ring 42 as well as a labyrinth seal 30. As may be seen in FIG. 1, the labyrinth seal 30 is arranged in the axial direction X-X between the compressor 2 and the mechanical seal 4. As a barrier gas, process gas is withdrawn from the pressure region of the compressor 2 and is fed into a barrier gas line 70. The process gas which has been withdrawn is then filtered, treated, heated and brought to a sealing gas pressure by means of a booster in a processing unit 10 and is subsequently fed into a cavity 11 between the mechanical seal 4 and the labyrinth seal 3. The labyrinth seal 30 has a gap 31 facing a shaft 5. This gap 31 has a radial width of approx. 200 µm. Basically, this arrangement of FIG. 1 has been well established. However, there is still a problem concerning the relatively high process gas consumption, which is usually in the range of 1,000 to 10,000 standard liters per minute. After passing through the labyrinth seal 30, the process gas is returned to the compressor chamber of the compressor. There is a small leakage into the atmosphere 6 through the mechanical seal 4, as indicated by the small arrows in FIG. 1. However, high consumption of process gas as a sealing gas in the mechanical seal arrangement 3 results in relatively large loss of efficiency of the compressor 2 with correspondingly high operating costs of the compressor and relatively great constructional effort to provide the barrier gas supply to the mechanical seal arrangement.

It is thus an object of the present invention to provide a compressor arrangement which, while having simple design and being easy and inexpensive to manufacture, allows to reduce an amount of process gas branched off as a barrier fluid to the mechanical seal and can thereby improve an efficiency of the compressor arrangement.

This object will be achieved by providing a compressor arrangement having the features of claim 1. The subclaims show preferred further embodiments of the invention.

The compressor arrangement according to the invention having the features of claim 1 has the advantage that an overall efficiency of a compressor arrangement can significantly be increased. Furthermore, an amount of process gas used as a barrier fluid of a mechanical seal arrangement can also significantly be reduced. Furthermore, the mechanical seal arrangement enables sealing using only one single seal, namely a mechanical seal. According to the invention, this will be achieved by the compressor arrangement comprising a compressor for compressing the process gas from a suction region towards a pressure region, and a mechanical seal arrangement. The mechanical seal arrangement is arranged on a shaft of the compressor to seal against an atmosphere. The mechanical seal arrangement comprises a mechanical seal having a stationary slide ring with a first sliding surface and a rotating slide ring with a second sliding surface. The two slide rings define a sealing gap between their sliding surfaces. Furthermore, a barrier fluid supply is provided with a barrier fluid line which extends from the pressure region of the compressor to the mechanical seal and through which process gas is branched off as a barrier fluid from the main flow in the compressor. The stationary slide ring has a through opening extending from a rear side of the stationary slide ring to an orifice at the first sliding surface of the stationary slide ring to supply process gas from the barrier fluid line through the stationary slide ring to the sealing gap.

Since the barrier gas used as a sealing fluid is fed through the stationary slide ring directly to the sealing gap and thus exits at the sliding surface of the stationary slide ring, there are two sealing regions at the sealing gap during operation, namely one radially above the orifice of the through opening and radially inside the orifice of the through opening. The sealing region below the orifice seals against the atmosphere, and the sealing region above the orifice of the through opening seals against the compressor. Preferably, at least one of the sealing regions, in particular the sealing region sealing against the compressor, is groove-free, i.e. without grooves or other recesses. Thus, the prior art labyrinth seal, which, in prior art, forms the second seal, may be omitted. Since the sealing gap between the sliding surfaces of the slide rings is only a few µm, in particular ≤10 µm, an amount of barrier fluid required during operation of the mechanical seal arrangement can significantly be reduced. In the prior art solution, the sealing gap on the labyrinth seal, which forms the second seal of the prior art mechanical seal arrangement, is about 200 µm. Thus, compared to prior art, the gap can be reduced by a factor of 20 or more in the present invention. This results in significantly reduced consumption quantities of barrier fluid by a factor of 20 or greater. Due to the reduced consumption quantities of barrier fluid, additional equipment of the barrier fluid supply can also be designed to be significantly smaller than in prior art. This in particular applies to processing units which, for example, have a filter, a heater and/or a cooler and a booster.

Another major advantage of the invention is that an axial overall length of the mechanical seal arrangement can be reduced by omitting the labyrinth seal. This results in reduced overall length of the compressor arrangement, which in turn offers high cost-saving potential for compressor manufacturers.

Preferably, the through opening, on the first sliding surface of the stationary slide ring, opens radially outside an average diameter of the sealing gap. This causes a length of the sealing gap in the radial direction above the through opening to be smaller than in the radial direction below the through opening. Particularly preferably, the through opening on the first sliding surface of the stationary slide ring opens such that the sealing gap is divided in the ratio 1/3 above the orifice to 2/3 below the orifice.

Preferably, the first sliding surface has a circumferential groove. The circumferential groove is formed as a recess in the first sliding surface of the stationary slide ring, so that the barrier fluid supplied through the stationary slide ring via the through opening is distributed in the circumferential direction of the sliding surface. Particularly preferably, the through opening in the stationary slide ring opens into the circumferential groove.

Further preferably, the second sliding surface of the rotating slide ring has a plurality of conveying grooves. This further improves distribution of the barrier fluid in the sealing gap and reduces leakage to the atmosphere.

The conveying grooves in the second sliding surface of the rotating slide ring are preferably located radially inside the orifice of the through opening on the stationary slide ring.

According to another preferred embodiment of the invention, the mechanical seal furthermore comprises a thrust ring with a bore, the thrust ring being arranged at the rear side of the stationary slide ring. The barrier fluid can thus be supplied through the bore in the thrust ring to the through opening in the stationary slide ring. The thrust ring preferably has a secondary seal, in particular an O-ring, on an outer and an inner circumference respectively. Furthermore, the thrust ring is further biased in the axial direction by means of a biasing device.

Preferably, a maximum quantity of 50 to 100 standard liters per minute of process gas is branched off from the compressor as barrier fluid and is fed to the mechanical seal via the barrier fluid line. Compared to the process gas quantity required in prior art, reduction by a factor of 20 to 100 of the amount of process gas branched off can be realized. This results in large savings when branching off barrier fluid, which can significantly increase compressor efficiency in the compressor arrangement.

In operation, the sealing gap between the rotating and stationary slide ring preferably has a width in the axial direction which is ≤10 μm, in particular ≤5 μm.

Particularly preferably, the compressor arrangement has no labyrinth seal and has a mechanical seal as the only main seal. According to the invention, that means it is possible for the compressor arrangement to be sealed using only one single mechanical seal as the main seal. Of course, it is possible that some secondary seals, in particular O-rings or the like, are provided on the one single mechanical seal to seal the components of the mechanical seal. However, there is no need to provide another main seal, such as a labyrinth seal or another mechanical seal, which are connected in series with the one single mechanical seal according to the invention. Thus, investment costs on the one hand and maintenance costs on the other hand can significantly be reduced, since the compressor arrangement requires only one single mechanical seal.

Figure 2:
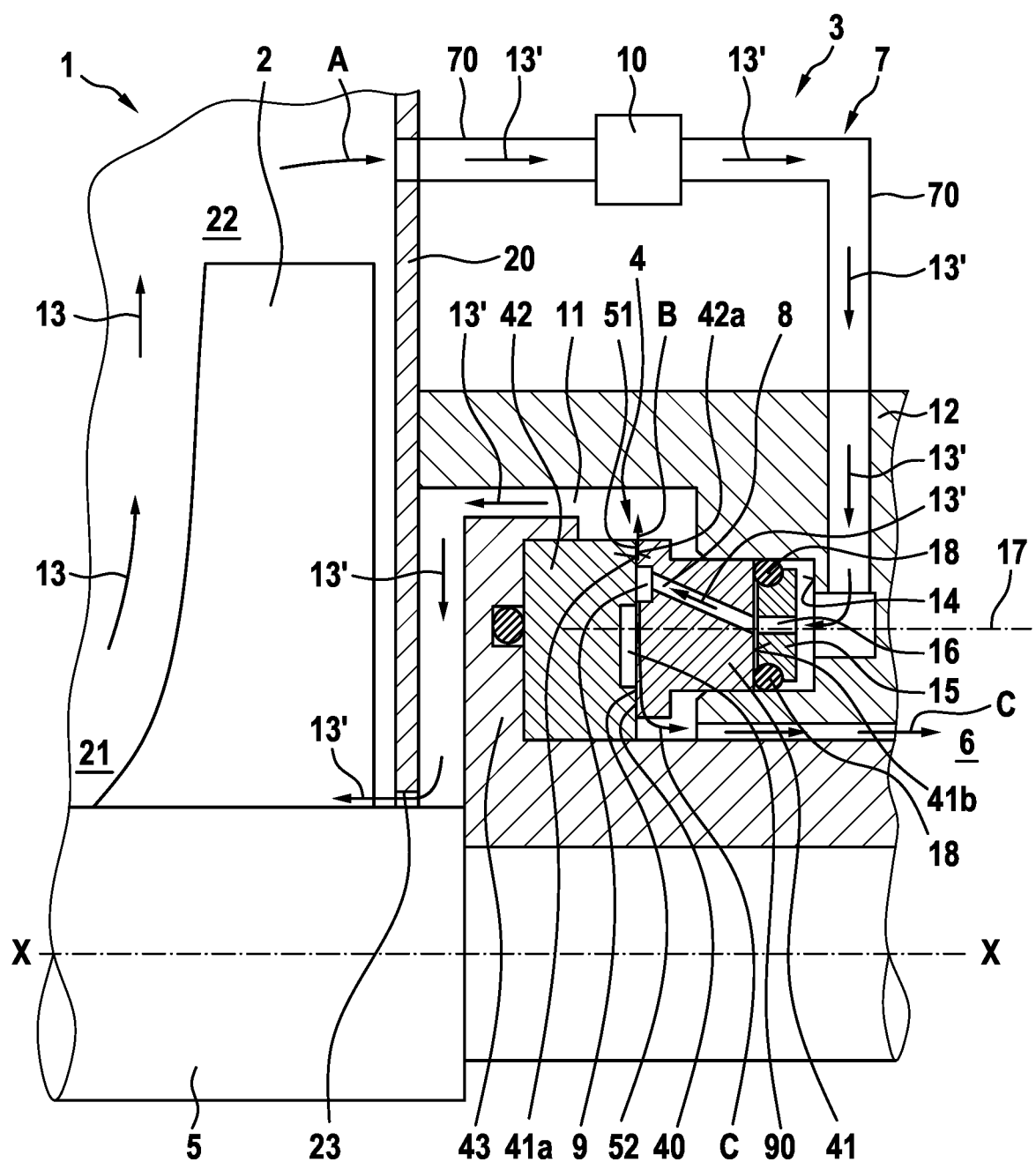

In the following, a preferred example embodiment of the invention will be described in detail, while reference is made to the accompanying drawing, wherein:

FIG. 1 is a schematic sectional view of a prior art compressor arrangement, and FIG. 2 is a schematic sectional view of a compressor arrangement according to a preferred example embodiment of the invention.

Referring now to FIG. 2, a compressor arrangement 1 according to a preferred example embodiment of the invention will be described in detail in the following.

The compressor arrangement 1 comprises a compressor 2 and a sealing arrangement comprising a mechanical seal arrangement 3. The mechanical seal arrangement 3 is arranged at a shaft 5 to seal the compressor 2 against an atmosphere 6.

The mechanical seal arrangement 3 comprises one single mechanical seal 4 and a barrier fluid supply 7. The mechanical seal 4 comprises a stationary slide ring 41 with a first sliding surface 41a and a rotating slide ring 42 with a second sliding surface 42a. A sealing gap 40 is defined between the first sliding surface 41a and the second sliding surface 42a.

The rotating slide ring 42 is fixed to the shaft 5 by means of a slide ring carrier 43 and rotates together with the shaft 5.

The compressor 2 compresses a process gas 13 to a predetermined pressure level from a suction region 21 toward a pressure region 22.

A barrier fluid line 70 is used to branch off process gas from the pressure region 22, which is used as a barrier fluid 13' in the mechanical seal arrangement. This is indicated by the arrow A in FIG. 2. The barrier fluid line 70 extends to a processing unit 10, which, for example, has a filter, a heater and/or a cooling unit and/or a booster for additional compression of the barrier fluid. The barrier fluid line 70 then extends through a housing 12 to a rear side 41b of the stationary slide ring 41.

The mechanical seal 4 is a gas-lubricated mechanical seal, and the barrier fluid may be at a pressure of about $100 \times 10^5$ Pa to $200 \times 10^5$ Pa.

As may be seen from FIG. 2, the stationary slide ring 41 is arranged in an annular recess 14 in a housing 12, into which the barrier fluid line 70 opens. A thrust ring 15 with a bore 16 is furthermore arranged in the recess 14. Two secondary seals 18 are arranged on an inner and an outer circumference of the thrust ring 15.

As may furthermore be seen from FIG. 2, a through opening 8 is formed in the stationary slide ring 41. The through opening 8 extends from the rear side 41b of the stationary slide ring 41 to the first sliding surface 41a. A circumferential groove 9 is formed in the first sliding surface 41a. The through opening 8 thus opens into the circumferential groove 9.

A number of conveying grooves 90, in particular sickle-shaped conveying grooves, are also formed in the rotating slide ring 42.

The circumferential groove 9 is arranged radially outside a central diameter 17 of the sealing gap 40.

This results in a first sealing region 51 at the sealing gap 40, which is located radially outside the orifice of the through opening 8 and seals against the compressor 2, and a second sealing region 52, which is located radially inside the orifice of the through opening 8 and seals against the atmosphere 6. A radial length (height) of the first sealing region 51 is smaller, and is preferably half of a radial length (height) of the second sealing region 52. The first sealing region 51 is groove-free.

Thus, the barrier fluid 13' branched off from the process gas passes through the barrier fluid line 70 to the rear side 41b of the stationary slide ring into the recess 14 in the housing 12 and from there through the bore 16 and the through opening 8 in the stationary slide ring to the circumferential groove 9. One portion of the barrier fluid 13' then passes across the first sealing region 51 into a cavity 11 located between the mechanical seal 4 and the compressor 2 (arrow B). From the cavity 11, a passage 23 is provided in a housing 20 of the compressor, so that this portion of the barrier fluid 13' is returned to the suction region 21 of the compressor. A second, smaller portion of the barrier fluid 13' passes across the second sealing region 52 in the direction of the atmosphere 6 (arrow C), thus forming the leakage to the atmosphere 6. However, by providing the radial conveying grooves 90, this leakage can be kept very small.

Thus, according to the invention, a barrier fluid supply 7 can be assured which requires only a fraction of the process fluid otherwise typically branched off as a barrier fluid. By supplying the barrier fluid 13' through the stationary slide ring 41 to the sealing gap 40 of the mechanical seal 4, the second main seal used in the prior art, which often is a labyrinth seal, may thus be omitted. This also significantly reduces an overall length in the axial direction X-X of the mechanical seal arrangement. Furthermore, equipment of the processing unit 10, such as a filter or a heating/cooling system as well as a booster, can be designed to be significantly smaller and more compact, thus reducing investment costs, in addition to saving installation space.

Since less process gas thus has to be branched off in accordance with the invention to maintain operation of the mechanical seal, efficiency of the compressor 2 is also significantly improved. This results in particularly large cost savings to a user of the compressor arrangement. Compared to a prior art labyrinth seal, in which a radial gap is about 200 μm, a sealing gap height at the sealing gap 40 of the mechanical seal 4 is in the range of a few μm, in particular ≤10 μm. This allows the process gas quantities required to be reduced by a factor of 20 to 100. Furthermore, the labyrinth seal-free sealing arrangement which has only one single mechanical seal as the main seal allows significant reduction of investment costs and maintenance costs.

LIST OF REFERENCE NUMBERS

1 Compressor arrangement
2 Compressor
3 Mechanical seal arrangement
4 Mechanical seal
5 Shaft
6 Atmosphere
7 Barrier fluid supply
8 Through opening
9 Circumferential groove
10 Processing unit
11 Cavity on mechanical seal facing the compressor
12 Mechanical seal housing
13 Process gas
13' Barrier fluid
14 Recess in housing
15 Thrust ring
16 Bore
17 Mean diameter of sealing gap
18 Secondary seal
20 Compressor housing
21 Suction region
22 Pressure region
23 Passage
30 Labyrinth seal
31 Gap on labyrinth seal
40 Sealing gap
41 Stationary slide ring
41a First sliding surface
41b Back of stationary slide ring
42 Rotating slide ring
42a Second sliding surface
43 Seal ring carrier
51 First sealing region
52 Second sealing region
70 Barrier fluid line
90 Conveying groove A Barrier fluid branching off from the process gas
B Barrier fluid flowing into cavity 11 across the first sealing region
C Barrier fluid flowing across the second sealing region (leakage to atmosphere)
X-X Axial direction

The invention claimed is:

1. A compressor arrangement comprising: a compressor for compressing a process gas from a suction region towards a pressure region, a mechanical seal arrangement for sealing against an atmosphere on a shaft of the compressor, said mechanical seal arrangement comprising a mechanical seal including a stationary slide ring with a first sliding surface and a rotating slide ring with a second sliding surface defining a sealing gap between the sliding surfaces, and a barrier fluid supply with barrier fluid line, which extends from the pressure region of the compressor to the mechanical seal and through which process gas is branched off from the pressure region as a barrier fluid, wherein the stationary slide ring has a through opening extending from a rear side of the stationary slide ring to an orifice at the first sliding surface of the stationary slide ring to supply process gas from the barrier fluid line through the stationary slide ring to the sealing gap; wherein the orifice of the through opening of the stationary slide ring partitions the sealing gap into a first sealing region radially outside the orifice of the through opening and a second sealing region radially inside the orifice of the through opening, at least one of the sealing regions being groove-free; and wherein the first sealing region, in the radial direction, is smaller than the second sealing region.

2. The compressor arrangement according to claim 1, wherein the through opening at the first sliding surface opens radially outside an average diameter of the sealing gap.

3. The compressor arrangement according to claim 1, further comprising a circumferential groove formed in the first sliding surface of the stationary slide ring.

4. The compressor arrangement according to claim 3, wherein the through opening opens into the circumferential groove.

5. The compressor arrangement according to claim 1, wherein a plurality of conveying grooves are formed in the second sliding surface of the rotating slide ring.

6. The compressor arrangement according to claim 5, wherein the conveying grooves are located radially inside the orifice of the through opening.

7. The compressor arrangement according to claim 1, wherein a quantity of process gas branched off from the compressor as a barrier fluid is in a range of 50 to 100 standard liters per minute.

8. The compressor arrangement according to claim 1, wherein the sealing gap is ≤10 μm when operating the mechanical seal.

9. The compressor arrangement according to claim 1, which does not comprise a labyrinth seal and which comprises the mechanical seal arrangement having exactly one mechanical seal as the single main seal.

\* \* \* \* \*